(12) United States Patent
Maruyama et al.

(10) Patent No.: US 8,297,812 B2
(45) Date of Patent: Oct. 30, 2012

(54) VEHICLE LIGHTING SYSTEM

(75) Inventors: Kazuyuki Maruyama, Saitama (JP); Yutaka Murata, Saitama (JP); Yojiro Tsutsumi, Saitama (JP); Toru Miyagawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 487 days.

(21) Appl. No.: 12/694,646

(22) Filed: Jan. 27, 2010

(65) Prior Publication Data

US 2010/0195340 A1    Aug. 5, 2010

(30) Foreign Application Priority Data

Jan. 29, 2009  (JP) .................................. 2009-018634
May 18, 2009  (JP) .................................. 2009-120262

(51) Int. Cl.
    *B62J 6/00*    (2006.01)
(52) U.S. Cl. .................... 362/473; 362/475; 362/544
(58) Field of Classification Search .......... 362/473–476, 362/543–545
    See application file for complete search history.

(56) References Cited

U.S. PATENT DOCUMENTS

| | | | | |
|---|---|---|---|---|
| 5,217,087 A | * | 6/1993 | Ikegami et al. | 180/219 |
| 6,814,477 B2 | * | 11/2004 | Yamaguchi et al. | 362/497 |
| 8,016,462 B2 | * | 9/2011 | May | 362/473 |
| 2006/0056191 A1 | | 3/2006 | Uemura et al. | |
| 2008/0205073 A1 | * | 8/2008 | Suita | 362/473 |
| 2010/0195339 A1 | * | 8/2010 | May | 362/473 |

FOREIGN PATENT DOCUMENTS

| | | |
|---|---|---|
| DE | 10 2007 010 747 A1 | 8/2008 |
| EP | 1 473 215 A1 | 11/2004 |
| EP | 1 767 398 A1 | 3/2007 |
| EP | 1 859 995 A2 | 11/2007 |
| JP | 2001-334976 A | 12/2001 |
| JP | 2006-298045 A | 11/2006 |

* cited by examiner

*Primary Examiner* — John A Ward
(74) *Attorney, Agent, or Firm* — Birch, Stewart, Kolasch & Birch, LLP

(57) ABSTRACT

A vehicle lighting system having a plurality of lighting apparatuses disposed so as to make a vehicle front surface reminiscent of a "face," wherein an outline of a light-emitting surface of each of the lighting apparatuses from blurring to be fused. A glare area G has a width y as expressed in an expression "y=a+b·ln(x) (ln is a natural logarithm)," "a=−107," and "b=39.6" when a main lighting apparatus has a luminous intensity of x is defined outside an outline OL of a main light-emitting surface in a vehicle front view, and an auxiliary lighting apparatus disposition area, in which an auxiliary lighting apparatus of a steadily lighting type different from a flashing type lighting apparatus is disposed, is set upwardly of the main lighting apparatus and outside the glare area G.

20 Claims, 14 Drawing Sheets

VEHICLE LIGHTING SYSTEM

CROSS-REFERENCE TO RELATED APPLICATIONS

The present application claims priority under 35 USC 119 to Japanese Patent Application No. 2009-018634 filed on Jan. 29, 2009 and Japanese Patent Application No. 2009-120262 filed on May 18, 2009 the entire contents of which are hereby incorporated by reference.

BACKGROUND OF THE INVENTION

1. Field of the Invention

The present invention relates to a vehicle lighting system suitable for use in motorcycles and other small-sized vehicles.

2. Description of Background Art

In the above-cited lighting system, a known vehicle lighting system includes a plurality of lighting apparatuses that are disposed on a front surface of a motorcycle so as to be reminiscent of a "face," thereby enhancing conspicuity of the motorcycle. See, for example, Japanese Patent Laid-Open No. 2006-298045. The most important part for representing the "face" is the "eye." To form a motorcycle that is reminiscent of the "face," it is important to form an effective "eye" by appropriately disposing a headlamp and a position lamp.

The known art represents the "eye" by representing the black part of the eye and the white part of the eye with the lighting apparatuses. The lighting apparatuses representing the black part of the eye and the white part of the eye are disposed relatively close to each other. This necessitates consideration for, for example, the shape or the lighting method to allow a third person to know the black part of the eye from the white part of the eye easily even when viewing from a distance. This makes the structure of the lighting system tend to be complicated.

SUMMARY AND OBJECTS OF THE INVENTION

It is therefore an object of an embodiment of the present invention to provide a vehicle lighting system having a plurality of lighting apparatuses disposed on a front surface of a small-sized vehicle, such as a motorcycle, so as to be reminiscent of a "face," to enhance the conspicuity of the vehicle with a relatively simple structure.

When a plurality of lighting apparatuses are disposed close to each other on front surface of a small-sized vehicle as described above, glare (a phenomenon in which an excessively bright local spot existing within a field of view makes an object to be viewed hard to view) tends to occur at nighttime particularly in areas around a main lighting apparatus emitting an intense light, such as a headlamp, so that an outline of a light-emitting surface of each lighting apparatus blurs, resulting in all of the light-emitting surfaces emitting a single light beam.

To resolve the above-described problems, the present inventors conducted extensive research for suitable conditions such as an area where the glare is readily generated (a glare area) is defined, and an auxiliary lighting apparatus of a steadily lighting type such as a position lamp is disposed by avoiding the area to inhibit the outline of the light-emitting surface of each lighting apparatus from blurring to be fused.

More specifically, an aspect of an embodiment of the present invention provides a vehicle lighting system having a main lighting apparatus including a main light-emitting surface that illuminates a vehicle forward area and flashing type lighting apparatuses disposed laterally sideways at the right and left of the main lighting apparatus in a vehicle front view. In this vehicle lighting system, a glare area with a width y as expressed in an expression given below when the main lighting apparatus has a luminous intensity of x is defined outside an outline of the main light-emitting surface in the vehicle front view and an auxiliary lighting apparatus disposition area, in which an auxiliary lighting apparatus of a steadily lighting type different from the flashing type lighting apparatuses is disposed, is set upwardly of the main lighting apparatus and outside the glare area.

$y = a + b \cdot \ln(x)$ (ln is a natural logarithm)

$a = -107$ $b = 39.6$

In accordance with this embodiment of the present invention, the auxiliary lighting apparatus disposition area is set at a position that is, in the vehicle front view, upward of an upper end of the glare area and laterally outside a left or right end of the glare area.

In accordance with an embodiment of the present invention, the auxiliary lighting apparatus disposition area is set, in the vehicle front view, within an area defined between a first inclined line extending obliquely upwardly at an angle of 35 degrees relative to a vertical line from a centroid of the main light-emitting surface and a second inclined line extending obliquely upwardly at an angle of 55 degrees relative to the vertical line from the centroid, and outside an area defined by a width 2y outside the outline of the main light-emitting surface.

In accordance with an embodiment of the present invention, the auxiliary lighting apparatus disposition area is an area surrounded by line segments specified by coordinates as detailed below when the centroid of the main light-emitting surface in the vehicle front view is defined as an origin and W [mm] is an abscissa and D [mm] is an ordinate.

A first line segment that passes through (W335, D450) and (W250, D310)

(2) A second line segment that passes through (W250, D310) and (W238, D224)

(3) A third line segment that passes through (W238, D224) and (W252, D210)

(4) A fourth line segment that passes through (W252, D210) and (W267, D224)

(5) A fifth line segment that passes through (W267, D224) and (W367, D342)

(6) A sixth line segment that passes through (W367, D342) and (W500, D390)

(7) A seventh line segment specified by D=450

(8) An eighth line segment specified by W=500

In accordance with an embodiment of the present invention, the auxiliary lighting apparatus has a light source disposed in the auxiliary lighting apparatus disposition area.

In accordance with an embodiment of the present invention, the auxiliary lighting apparatus emits light in an annular shape in the vehicle front view and a center of the annular shape is disposed in the auxiliary lighting apparatus disposition area.

In accordance with an embodiment of the present invention, the auxiliary lighting apparatus emits light in a line segment shape inclined so as to be disposed more upwardly at outer sides in a vehicle width direction in the vehicle front view, the auxiliary lighting apparatus being disposed at an angle of 0 to 60 degrees relative to a vertical line and having at least a length of 150 [mm].

In accordance with an embodiment of the present invention, the main lighting apparatus and the flashing type lighting apparatus emit light of different colors from each other and the auxiliary lighting apparatus emits light of a similar color as that of the light emitted by the main lighting apparatus.

In accordance with an embodiment of the present invention, the auxiliary lighting apparatuses are disposed symmetrically about the main lighting apparatus.

In accordance with an embodiment of the present invention, the vehicle includes a low beam lamp illuminating a relatively nearby area and a high beam lamp illuminating a remote area relative to the area illuminated by the low beam lamp and the main lighting apparatus is the low beam lamp.

In accordance with an embodiment of the present invention, the main lighting apparatus includes a low beam lamp illuminating a relatively nearby area and a high beam lamp illuminating a remote area relative to the area illuminated by the low beam lamp and the auxiliary lighting apparatus disposition area is set corresponding to the glare area when the low beam lamp is turned ON.

In accordance with an embodiment of the present invention, the vehicle front surface is made to be readily reminiscent of a "face," having the main lighting apparatus as a "mouth" and the auxiliary lighting apparatuses as "eyes," so that the conspicuity of the vehicle can be easily enhanced.

The auxiliary lighting apparatuses, being disposed outside the glare area of the main lighting apparatus, help inhibit the outline of the light-emitting surface of each lighting apparatus from blurring to be fused. The vehicle front surface can therefore be readily reminiscent of a "face," so that the conspicuity of the vehicle can be easily enhanced. The steadily lighting type auxiliary lighting apparatus is provided in addition to the flashing type lighting apparatuses. This results in the "mouth" and the "eyes" being steadily lit up, which helps make the vehicle front surface reminiscent of a "face."

In accordance with the aspect of the present invention, the auxiliary lighting apparatuses are disposed upwardly of the upper end of the glare area of the main lighting apparatus and laterally outside apart from each other. In addition, the auxiliary lighting apparatuses are disposed at appropriate positions equivalent to the "eyes" of the "face," of which the vehicle front face is reminiscent. This makes the vehicle front surface readily reminiscent of the "face," so that the conspicuity of the vehicle can be easily enhanced.

In accordance with an embodiment of the present invention, the auxiliary lighting apparatus is disposed even further apart from the glare area of the main lighting apparatus. In addition, the auxiliary lighting apparatuses are disposed at even more appropriate positions equivalent to the "eyes" of the "face," of which the vehicle front face is reminiscent. The conspicuity of the vehicle can therefore be even more easily enhanced.

In accordance with an embodiment of the present invention, the light source of the auxiliary lighting apparatus emits an even more intense light and the contrast with surrounding areas is more readily reminiscent of the black part of the "eye." This makes the vehicle front surface readily reminiscent of the "face" effectively.

In accordance with an embodiment of the present invention, the center of the annular shape emits light less intense than that emitted by the light-emitting surface of the annular shape. This contrast is more readily reminiscent of the black part of the "eye," which makes the vehicle front surface readily reminiscent of the "face" effectively.

In accordance with an embodiment of the present invention, based on the fact that human beings recognize more easily an oblique component as compared with vertical and horizontal components, the auxiliary lighting apparatus is arranged to emit light in an oblique line segment shape and have an adequate length. The arrangements help make the "eye" more easily recognizable. This makes the vehicle front surface readily reminiscent of the "face," so that the conspicuity of the vehicle can be easily enhanced.

In accordance with an embodiment of the present invention, the main lighting apparatus and the auxiliary lighting apparatus are made to emit light of a color different from that of a flasher or other flashing type lighting apparatus. This helps make the vehicle front surface readily reminiscent of the "face," having the main lighting apparatus as a "mouth" and the auxiliary lighting apparatuses as "eyes," regardless of whether the flashing type lighting apparatus is turned ON, so that the conspicuity of the vehicle can be easily enhanced.

In accordance with an embodiment of the present invention, the auxiliary lighting apparatuses as the "eyes" are disposed symmetrically about the main lighting apparatus as the "mouth." This makes the vehicle front surface even more readily reminiscent of the "face."

In accordance with an embodiment of the present invention, the main lighting apparatus is a low beam lamp. This allows a high beam lamp to be disposed without regard to the position of the auxiliary lighting apparatus, which easily enhances the degree of freedom in disposing the high beam lamp.

In accordance with an embodiment of the present invention, the vehicle front surface is reminiscent of the "face" when the low beam lamp is turned ON. This makes it easier to enhance conspicuity of the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
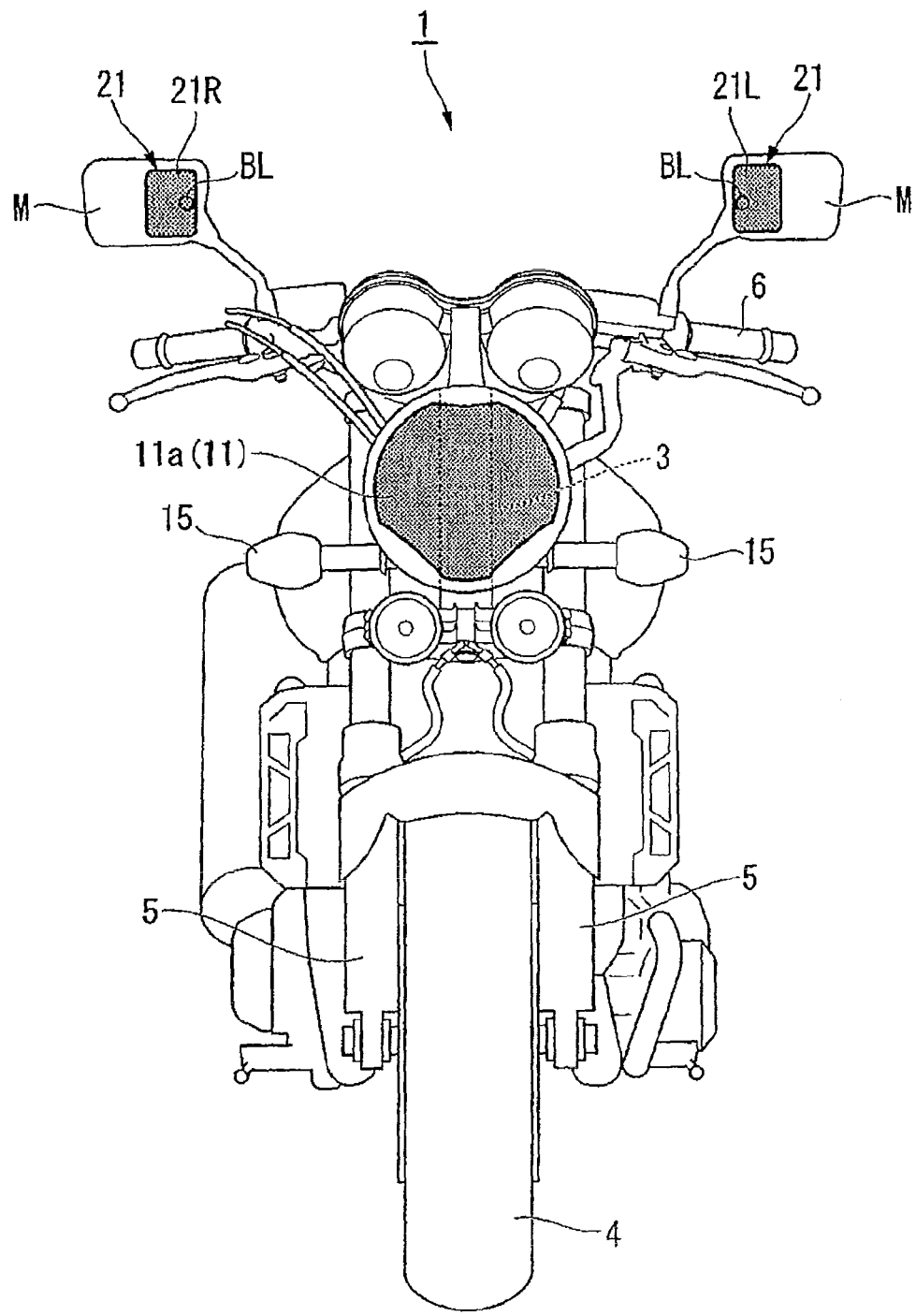
FIG. 1 is a front view showing a motorcycle according to an embodiment of the present invention.

A specific embodiment to which the present invention is applied will be described below with reference to the accompanying drawings. Throughout the descriptions given hereunder, longitudinal, lateral, and other directions are the same as those in the vehicle unless otherwise specified.

FIGS. 1 to 5 are front views (vehicle front views) showing a motorcycle 1 mounted with a vehicle lighting system according to an embodiment of the present invention as viewed from the front of the vehicle. The lighting system includes a single-bulb headlamp (hereinafter referred to as a "main lighting apparatus") 11 disposed at a center in a vehicle lateral direction to illuminate a vehicle forward area and left and right front flashers or hazard lamps (hereinafter referred to as flashing type lighting apparatuses) 15 disposed laterally sideways of the main lighting apparatus 11. The lighting system further includes steadily lighting type left and right position lamps (hereinafter referred to as auxiliary lighting apparatuses) 21 to 24 disposed upwardly of the main lighting apparatus 11 at left and right symmetrical positions. Of these, the main lighting apparatus 11 and the auxiliary lighting apparatuses 21 to 24 are disposed so as to make a vehicle front surface reminiscent of a "face," so that the motorcycle 1 is easily identifiable from an outside and conspicuity of the motorcycle 1 can thereby be enhanced. Specifically, the vehicle lighting system includes the pair of left and right auxiliary lighting apparatuses that are equivalent to "eyes" of the "face," of which the vehicle front face is reminiscent, and the single main lighting apparatus that is equivalent to a "mouth" of the "face." The main lighting apparatus 11 and the auxiliary lighting apparatuses 21 to 24 light up steadily when a main switch of the motorcycle 1 is turned ON (or, for example, a lamp switch is further turned ON) and the flashing type lighting apparatuses 15 flash off and on when the main switch of the motorcycle 1 is turned ON and, for example, a flasher switch or a hazard switch is turned ON.

Referring to FIGS. 1 through 5, a head pipe 3 is disposed at a front end of a vehicle body frame, for steerably supporting a front wheel 4 and a front wheel suspension system. A front fork 5 includes a lower end portion that journals the front wheel 4. A handlebar 6 is provided for steering the front wheel 4. Note here that each of the lighting apparatuses shown in FIGS. 1 to 5 is mounted on, and rotatable with, the front wheel suspension system. At least one of these lighting apparatuses may instead be fixedly mounted on the vehicle body frame via, for example, a stay or a cowling. Further, the main lighting apparatus may be a dual-bulb type or a type having three or more bulbs including a plurality of light-emitting surfaces.

In addition, the main lighting apparatus 11 (headlamp) has a single lighting body in which a high beam lamp (driving headlamp) or a low beam lamp (meeting headlamp) is selected for use. However, the high beam lamp and the low beam lamp may instead be formed in respective individual lighting bodies. In addition, while the main lighting apparatus 11 and the auxiliary lighting apparatuses 21 to 24 emit light of a similar color, such as, for example, white, the flashing type lighting apparatuses 15 emit light of a color different from that of the main lighting apparatus 11 and the auxiliary lighting apparatuses 21 to 24, such as, for example, orange.

The disposition of each of the above-described lighting apparatuses will be described below.

The low beam lamp of the main lighting apparatus 11 according to the embodiment of the present invention has a luminous intensity equivalent to 750 [cd] (55 [W]) when the low beam lamp is turned ON. When the main lighting apparatus 11 with the low beam lamp turned ON is viewed from a vehicle forward direction, an area (glare area) G outside an outline OL of a main light-emitting surface 11a, in which glare (a phenomenon in which an excessively bright local spot existing within a field of view makes an object to be viewed hard to view) tends more easily to occur, is defined by a width y as expressed in expression 1 shown below when the luminous intensity of the main light-emitting surface 11a is x. Referring, for example, to FIG. 6(b), reference numeral H/L indicates a centroid (and the position of a light source (bulb), the center of a reflector, and a light-emitting center according to an embodiment of the present invention) of the main light-emitting surface 11a of the main lighting apparatus 11.

[Expression 1]

$$y = a + b \cdot \ln(x) \text{ (ln is a natural logarithm)}$$

$$a = -107$$

$$b = 39.6 \tag{1}$$

Figure 15:
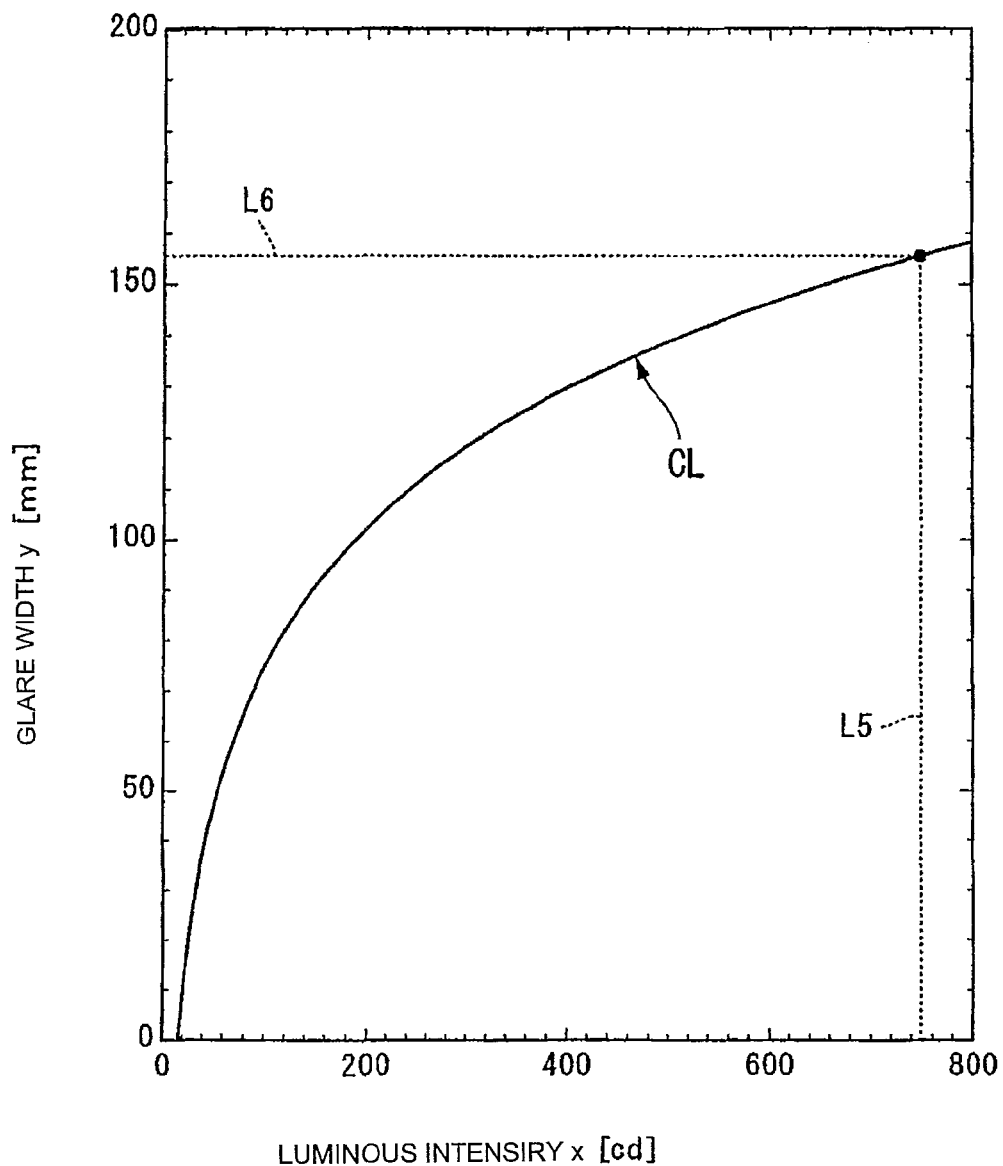
FIG. 15 is a graph showing changes in a glare width y relative to a luminous intensity x of the main lighting apparatus.

FIG. 15 is a graph showing a relationship between the luminous intensity x [cd] of the main lighting apparatus 11 of a round-eye, single-bulb type laid off on the abscissa and the glare width y [mm] laid off on the ordinate. In FIG. 15, a curve CL represents approximate data obtained experimentally by the inventor and is expressed by the expression 1. Further, in FIG. 15, a line segment L5 represents the luminous intensity x=750 [cd] and reference numeral L6 is a line segment representing the glare width y=155 [mm].

Figure 6A:
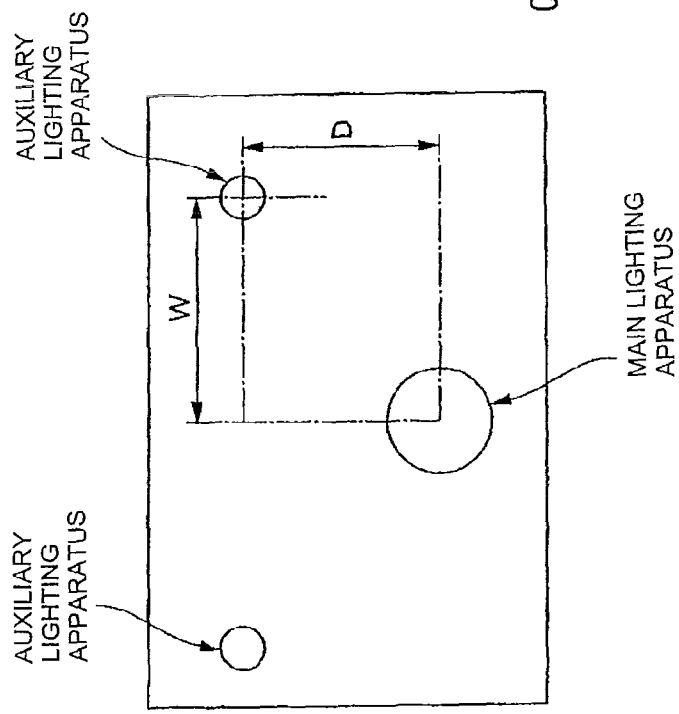
FIGS. 6(a) and 6(b) are explanatory diagrams for illustrating operation of the embodiment of the present invention, FIG. 6(a) showing predetermined dimensions in a front view of a motorcycle having a single main lighting apparatus and FIG. 6(b) showing a distribution of identification rates of the motorcycle according to the predetermined dimensions.
Figure 6B:
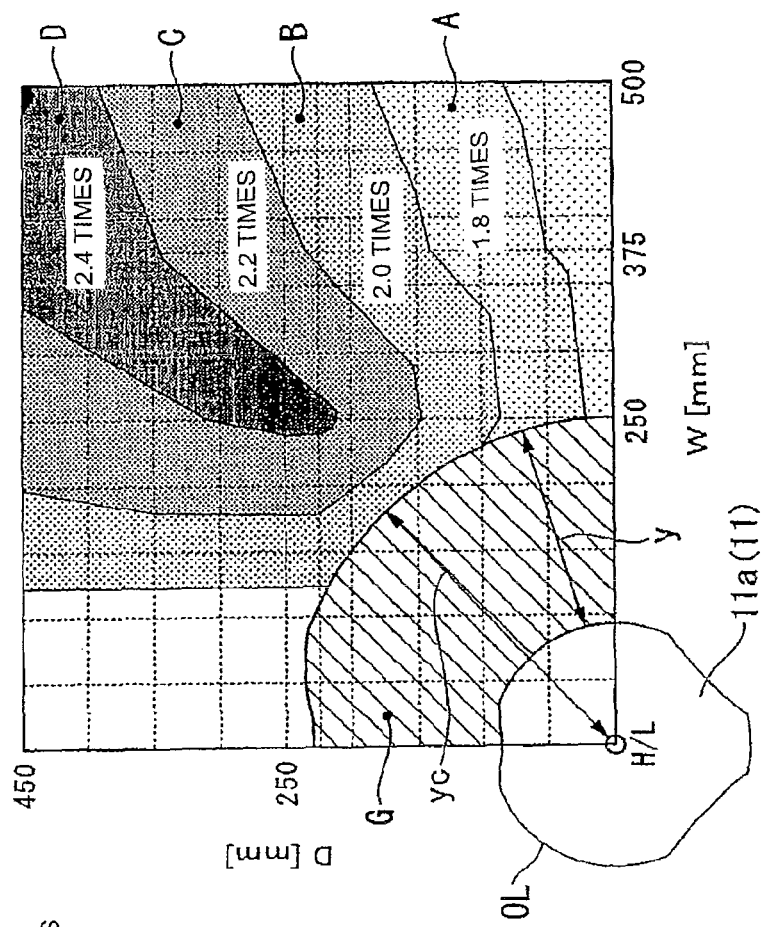

Referring to FIGS. 1, 6(a), and 6(b), assume that, for example, light-emitting surfaces (auxiliary light-emitting surfaces) 21L, 21R of the auxiliary lighting apparatuses 21 are disposed within the glare area G outside the main lighting apparatus 11. This may cause an outline of the light-emitting surface of each lighting apparatus to blur, so that all of the light-emitting surfaces seem to be combined together to emit a single light. To make the vehicle front surface reminiscent of the "face" effectively, therefore, it is desirable that the light-emitting surfaces of the auxiliary lighting apparatuses be disposed outside the glare area G in the vehicle front view.

Referring to FIG. 6(b), "1.8 times" of area A means a ratio of an identification rate of the motorcycle 1 to be described later for a case in which the auxiliary lighting apparatus is disposed in area A and turned ON to the identification ratio of the motorcycle 1 for a case in which only the main lighting apparatus 11 is turned ON. More specifically, the identification rate of the motorcycle 1 having the auxiliary lighting apparatus in area A in addition to the main lighting apparatus is 1.8 times as much as the identification rate of the motorcycle 1 having only the main lighting apparatus. Similarly, if the auxiliary lighting apparatus is disposed in area B shown in FIG. 6(b), the identification rate is 2.0 times; if the auxiliary lighting apparatus is disposed in area C shown in FIG. 6(b), the identification rate is 2.2 times; and if the auxiliary lighting apparatus is disposed in area D shown in FIG. 6(b), the identification rate is 2.4 times. Note that FIGS. 6(b) and 7 to 9 are graphs having W of FIG. 6(a) on the abscissa and D of FIG. 6(a) on the ordinate. Note also that, in FIGS. 6(b) and 7 to 9, areas are shown only on the left-hand side of the vehicle. However, each of those areas is to exist also on the right-hand side of the vehicle, more specifically, the areas are to exist symmetrically. In addition, the auxiliary lighting apparatus is to have a luminous intensity equivalent to 16 [cd] (equivalent to a 5-[W] incandescent lamp). The identification rates are distributed independently of the size of the glare area and the distribution remains the same regardless of whether the glare area is large or small as long as the auxiliary lighting apparatus is disposed outside the glare area.

Note here that the statement that "the auxiliary lighting apparatus is disposed in each area" means that at least part of the light-emitting surface of the auxiliary lighting apparatus exists in each area in the vehicle front view and, preferably, the bulb (light source, light-emitting center, centroid) of the auxiliary lighting apparatus exists in each area. If the auxiliary lighting apparatus has a plurality of light-emitting surfaces within each area, the centroid of each light-emitting surface is combined together with each other to serve as a centroid of the whole. Note also that the light-emitting surface includes a light source screen, such as a monitor screen.

Figure 7:
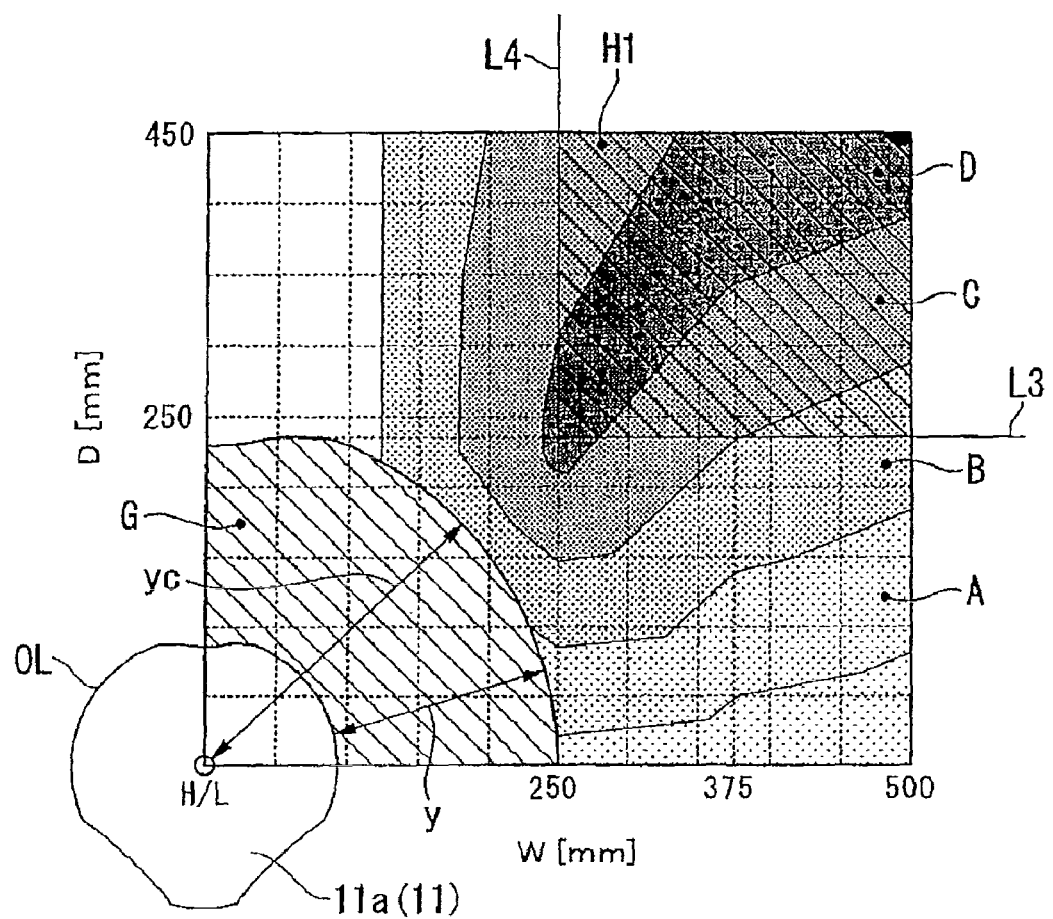
FIG. 7 is an explanatory diagram for illustrating a first definition example of auxiliary lighting apparatus disposition areas based on FIG. 6(b)

Referring to FIG. 7, an area H1, in which the auxiliary lighting apparatus is disposed, is set at a position that is, in the vehicle front view, upward of an upper end of the glare area G and laterally outside a left or right end of the glare area G. Then, disposing the light-emitting surface of the auxiliary lighting apparatus in the area H1 achieves an identification rate that is 2.0 times or more as much as the identification rate when the motorcycle 1 has only the main lighting apparatus 11. In FIG. 7, a line segment L3 indicates the upper end position of the glare area G and L4 denotes a line segment L4 indicates the left/right end position of the glare area G. The area H1 in which the auxiliary lighting apparatus is disposed is to be set within a range of 500 [mm] in a horizontal direction from the centroid H/L and 450 [mm] upward in a vertical direction therefrom.

Figure 8:
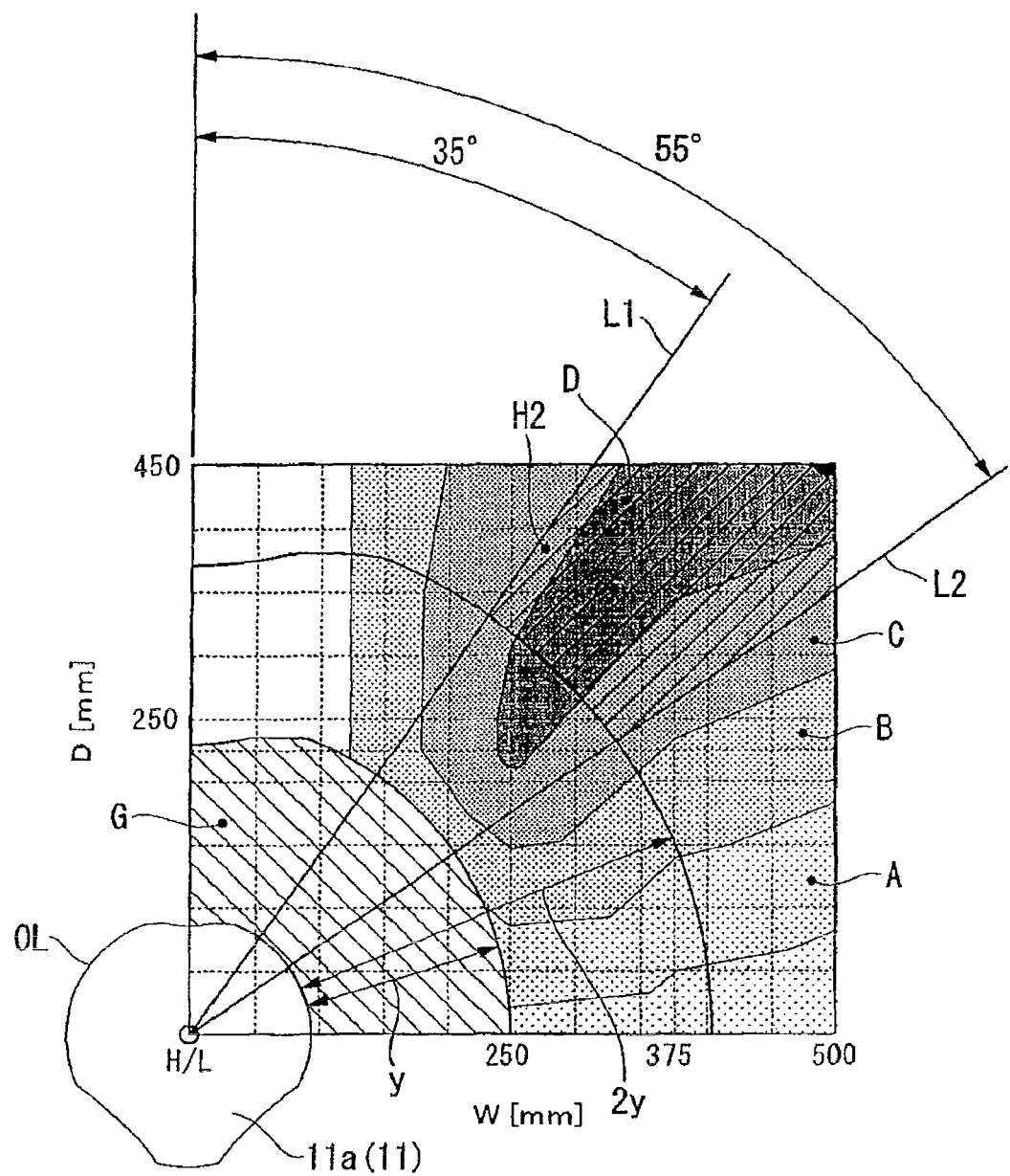
FIG. 8 is an explanatory diagram for illustrating a second definition example of auxiliary lighting apparatus disposition areas based on FIG. 6(b)

Referring to FIG. 8, an area 112, in which the auxiliary lighting apparatus is disposed, is set, in the vehicle front view, within an area defined between a first inclined line L1 extending obliquely upwardly, at an angle of 35 degrees relative to a vertical line, from the centroid H/L of the main light-emitting surface 11a and a second inclined line L2 extending obliquely upwardly, at an angle of 55 degrees relative to the vertical line, from the centroid H/L, and outside an area 2G defined by a width 2y outside the outline OL of the main light-emitting surface 11a. Disposing the light-emitting surface of the auxiliary lighting apparatus in the area H2 achieves an identification rate that is 2.2 times or more as much as the identification rate when the motorcycle 1 has only the main lighting apparatus 11. The area 112 in which the auxiliary lighting apparatus is disposed is to be set within a range of 500 [mm] in the horizontal direction from the centroid H/L and 450 [mm] upward in the vertical direction therefrom.

Figure 9:
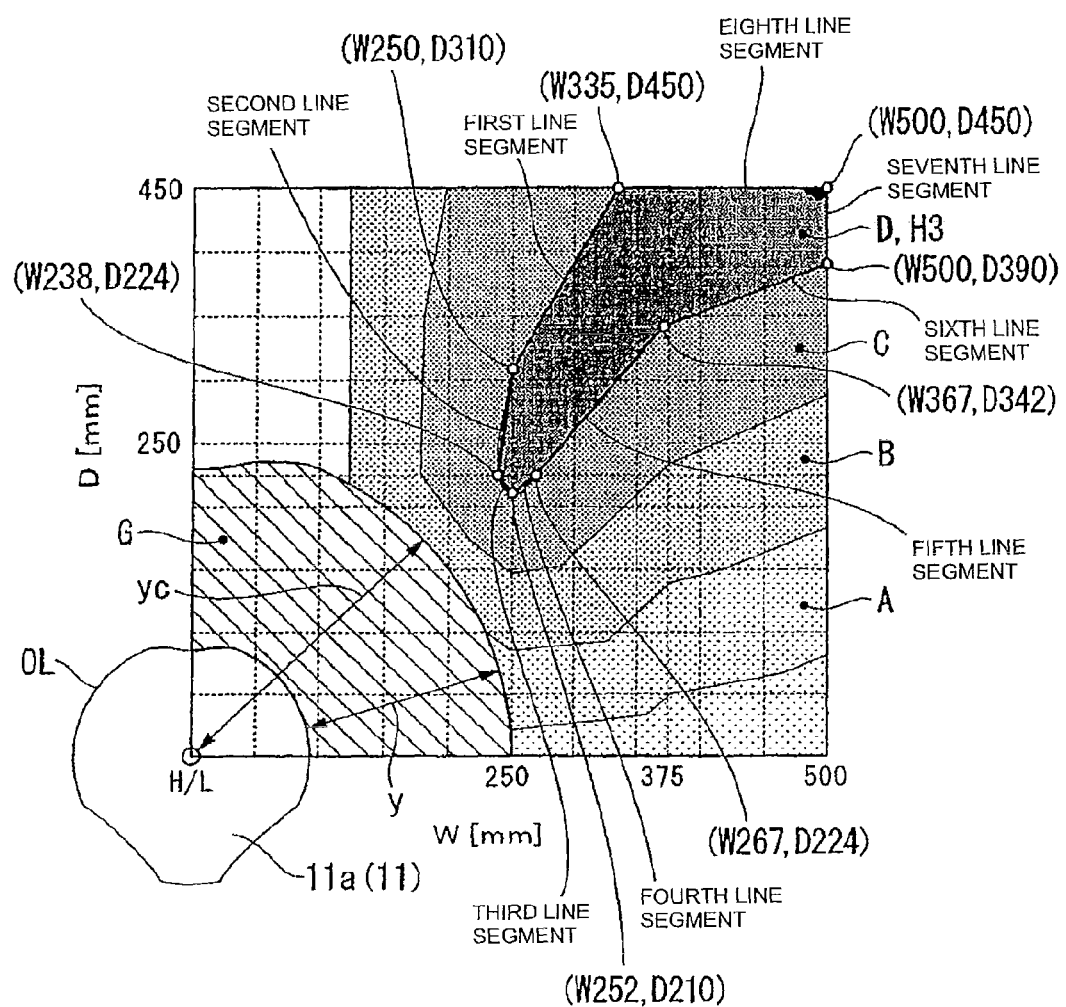
FIG. 9 is an explanatory diagram for illustrating a third definition example of auxiliary lighting apparatus disposition areas based on FIG. 6(b)

Further, referring to FIG. 9, an area (which substantially corresponds to the abovementioned area D) surrounded by line segments specified by coordinates as detailed below when the centroid H/L of the main light-emitting surface 11a in the vehicle front view is defined as an origin and D [mm] is the ordinate and W [mm] is the abscissa, is set as an area H3 in which the auxiliary lighting apparatus is disposed. Then, disposing the auxiliary lighting apparatus in the area H3 achieves an identification rate that is substantially 2.4 times as much as the identification rate when the motorcycle 1 has only the main lighting apparatus 11.

A first line segment that passes through (W335, D450) and (W250, D310)

A second line segment that passes through (W250, D310) and (W238, D224)

A third line segment that passes through (W238, D224) and (W252, D210)

A fourth line segment that passes through (W252, D210) and (W267, D224)

A fifth line segment that passes through (W267, D224) and (W367, D342)

A sixth line segment that passes through (W367, D342) and (W500, D390)

A seventh line segment specified by D=450

An eighth line segment specified by W=500

The lighting system shown in FIG. 1 typically includes the auxiliary lighting apparatuses 21 having the light-emitting surfaces 21R, 21L, each having a rectangular shape in the vehicle front view, disposed on front surfaces of housings of left and right rearview mirrors M. In FIG. 1, a bulb BL (light source) of the auxiliary lighting apparatus 21 is provided.

Figure 2:
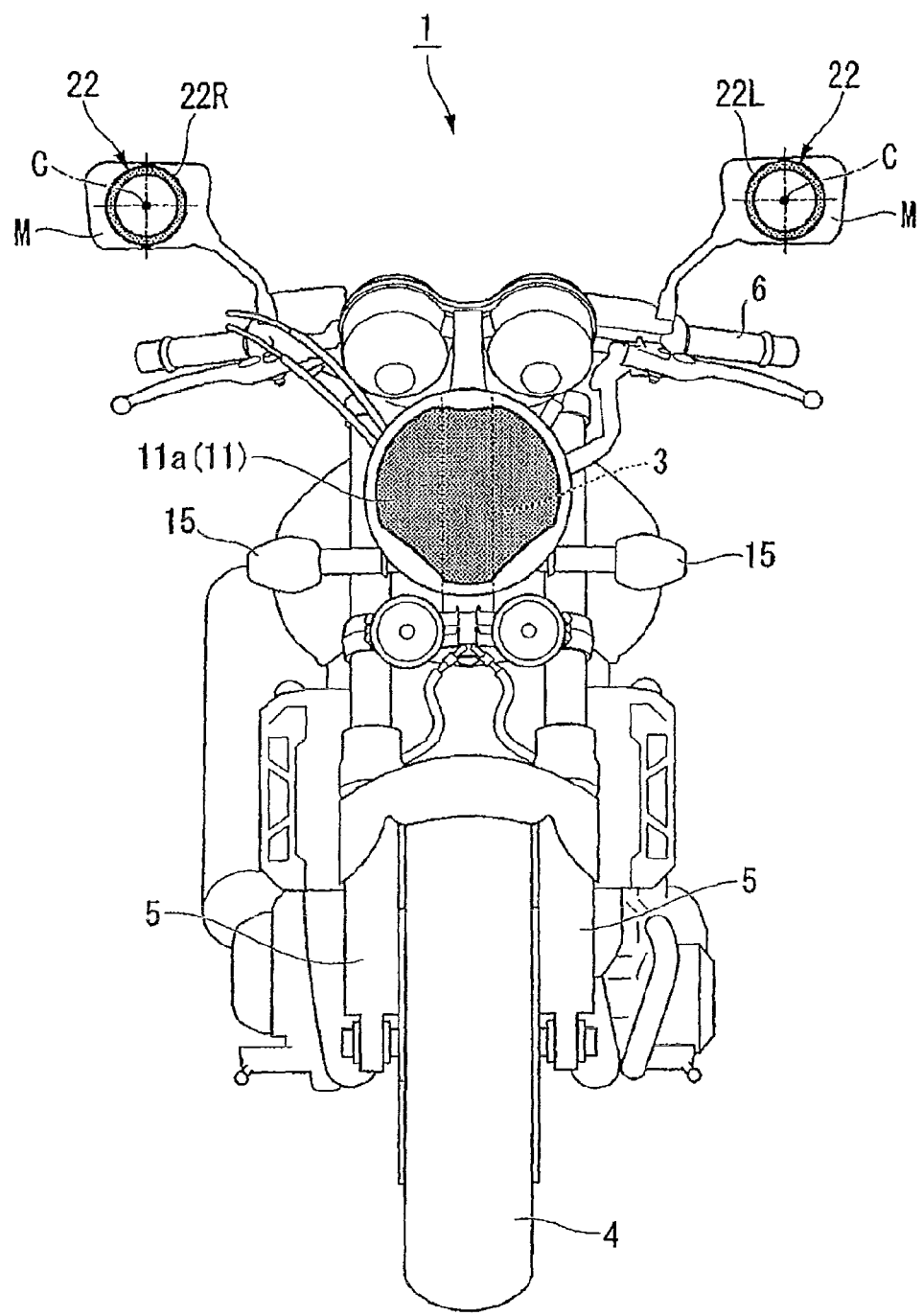
FIG. 2 is a front view showing a motorcycle according to a first modified example of the embodiment of the present invention.

The lighting system shown in FIG. 2, on the other hand, typically includes the auxiliary lighting apparatuses 22 having light-emitting surfaces 22R, 22L, each having an annular shape in the vehicle front view, disposed on front surfaces of housings of left and right rearview mirrors M. In FIG. 2, a center C of each of the auxiliary light-emitting surface 22R, 22L is provided.

Figure 11:
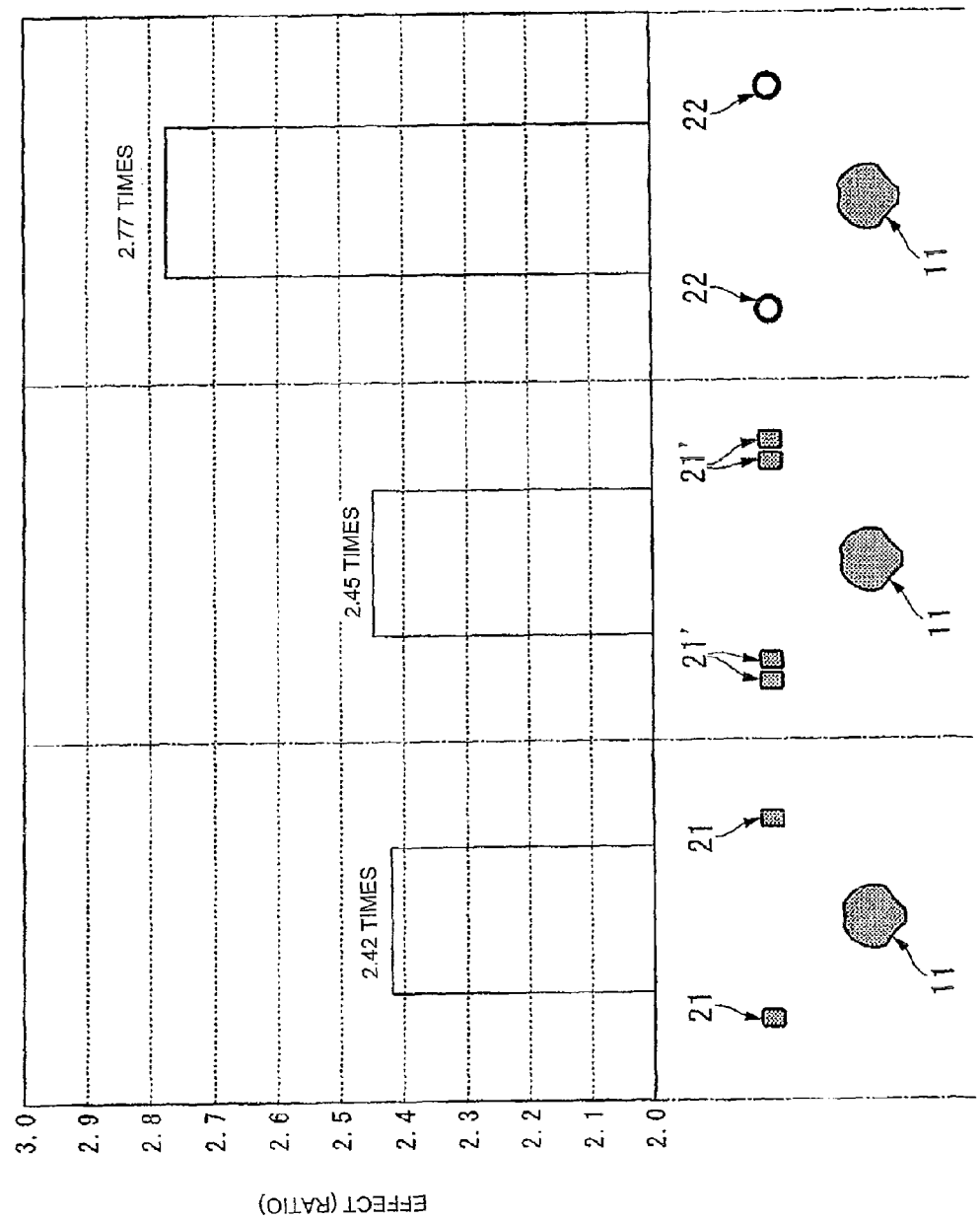
FIG. 11 is a graph showing changes in the identification rate of the motorcycle when a light-emitting surface of the auxiliary lighting apparatus is varied.

A graph shown in FIG. 11 shows, in sequence from the left to the right, the identification rate of the motorcycle having the auxiliary lighting apparatuses 21 that have the rectangular light-emitting surfaces 21R, 21L, the identification rate of a motorcycle having auxiliary lighting apparatuses 21' that have similar light-emitting surfaces disposed additionally on the lateral outside of the light-emitting surfaces 21R, 21L, and the identification rate of the motorcycle having the auxiliary lighting apparatuses 22 that have the annular light-emitting surfaces 22R, 22L.

The auxiliary lighting apparatus 21 shown in FIG. 11 is disposed such that a light source having a luminous intensity equivalent to 16 [cd] (equivalent to a 5-[W] incandescent lamp) is disposed at a position of 250 [mm] in the horizontal direction and 250 [mm] upward in the vertical direction from the centroid H/L. Similarly, the auxiliary lighting apparatus 21' is disposed such that a light source having a luminous intensity equivalent to 16 [cd] is disposed additionally laterally outside the light source of the auxiliary lighting apparatuses 21. The auxiliary lighting apparatus 22 is disposed such that the position of the light source of the auxiliary lighting apparatuses 21 is disposed at a center of the annular shape (the luminous intensity is equivalent to that of the auxiliary lighting apparatuses 21).

More specifically, it is known that, when the auxiliary lighting apparatuses have the annular light-emitting surfaces, the light-emitting surfaces are enhanced as the "eyes" of the "face" of which the motorcycle front face is reminiscent, so that the identification rate, more specifically, the conspicuity of the motorcycle can be further enhanced. The annular light-emitting surface has an inside diameter of at least 80 [mm]. The rectangular light-emitting surface has approximate dimensions of 55 [mm] in height by 75 [mm] in width.

Figure 3:
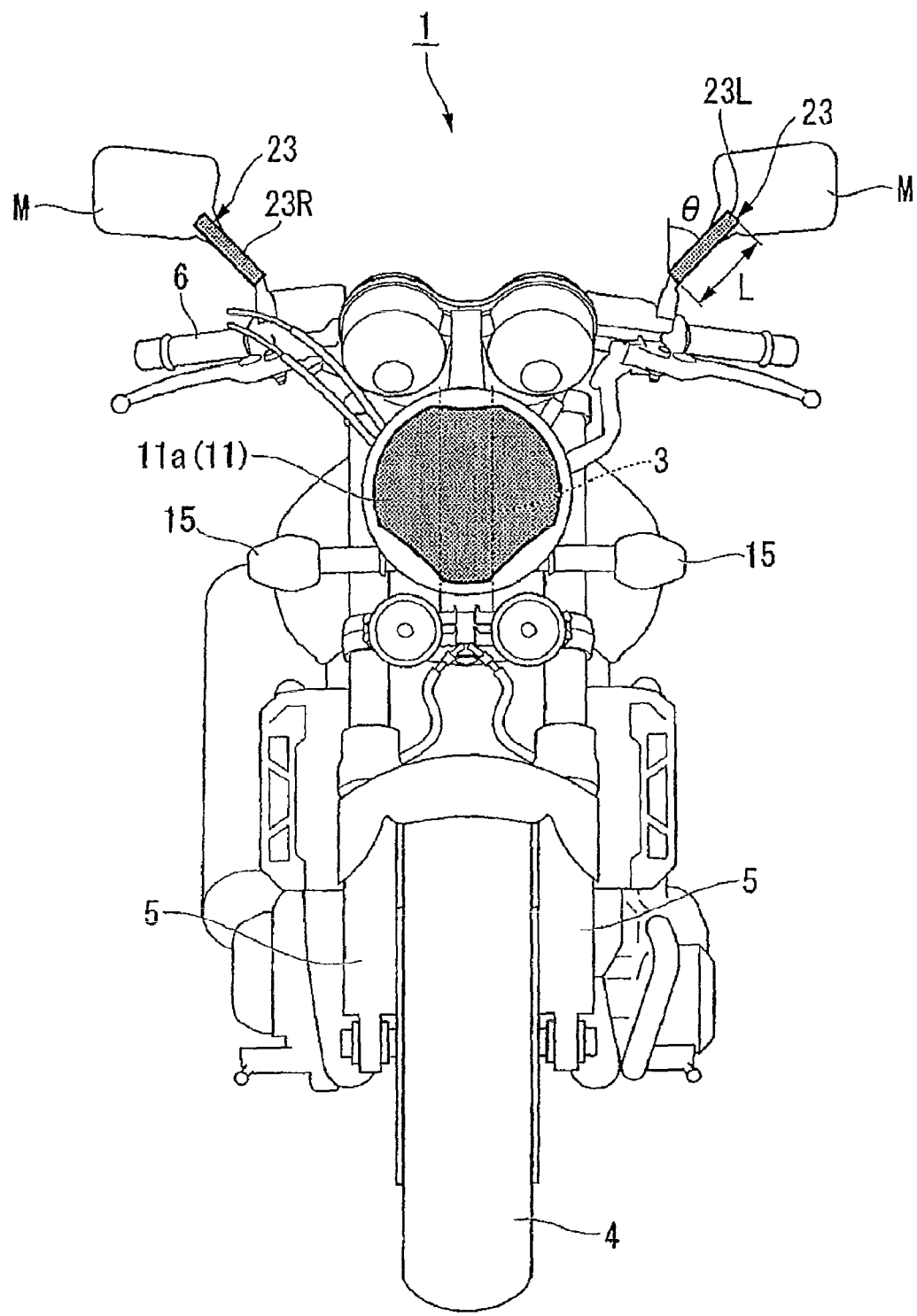
FIG. 3 is a front view showing a motorcycle according to a second modified example of the embodiment of the present invention.

FIG. 3 shows an example, in which the auxiliary lighting apparatuses 23 are disposed on front surfaces of stays of left and right rearview mirrors M so as to be inclined in the vehicle front view to follow along the front surfaces. The auxiliary lighting apparatuses 23 have light-emitting surfaces 23R, 23L, each being of a line segment shape (oblique line segment shape) inclined so as to be disposed more upwardly at outer sides in a vehicle width direction. The light-emitting surfaces 23R, 23L are equivalent to the "eyes" of the "face" of which the motorcycle front face is reminiscent. A light source (centroid) having a luminous intensity equivalent to 16 [cd] is disposed at a position of 250 [mm] in the horizontal direction and 250 [mm] upward in the vertical direction from the centroid H/L. Each of the light-emitting surfaces 23R, 23L is disposed so as to form an angle θ of 60 degrees or less relative to a vertical line with a lower end on the inside in the vehicle width direction as a base point and so that a length L thereof measures 50 [mm] or more. The line segment shape may be curved, as long as it is substantially linear.

Figure 12:
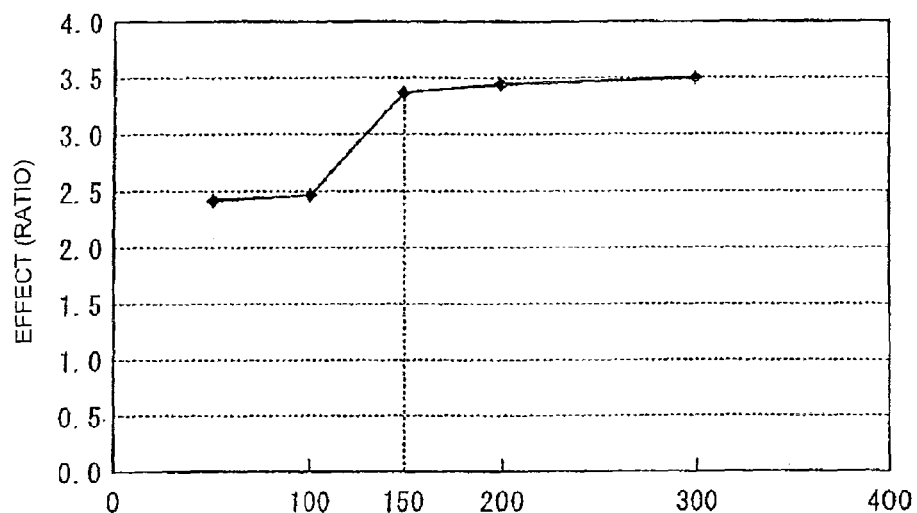
FIG. 12 is a graph showing changes in the identification rate of the motorcycle when the length of the light-emitting surface in the modified example shown in FIG. 3 is varied.

FIG. 12 shows results of measurements taken of the identification rate of the motorcycle by varying the length L of the line segment shape with the angle θ of the light-emitting surface of the auxiliary lighting apparatus 23 set at 60 degrees. FIG. 12 tells that, while the identification rate is maintained at relatively high values when the length L is 150 [mm] or more, there is a significant reduction in the identification rate when the length L becomes less than 150 [mm]. Note that, if part of the line segment shape overlaps the glare area G, the length L is a length of a portion not overlapping the glare area G.

Figure 13:
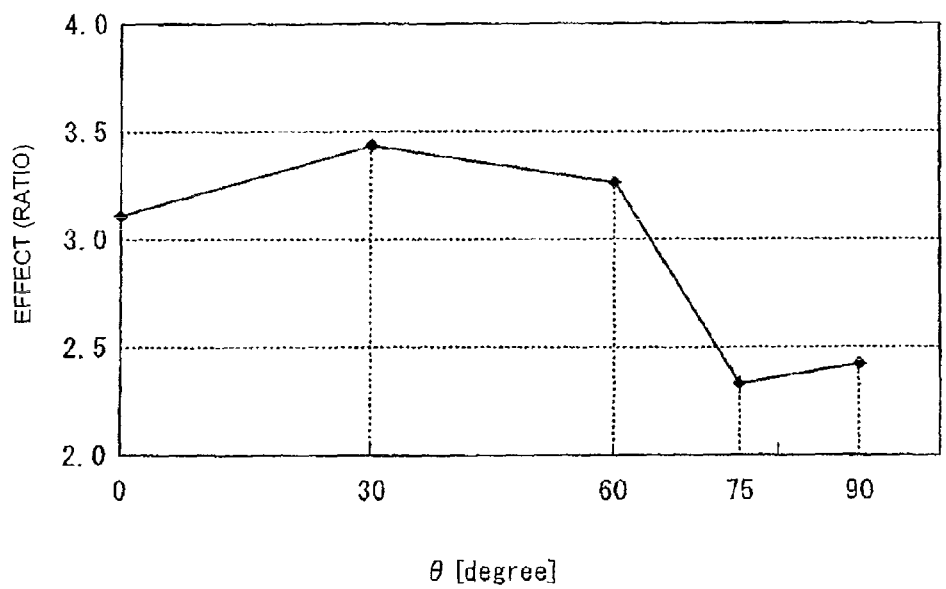
FIG. 13 is a graph showing changes in the identification rate of the motorcycle when the angle of the light-emitting surface in the modified example shown in FIG. 3 is varied.

FIG. 13 shows results of measurements taken of the identification rate of the motorcycle by varying the angle θ of the line segment shape with the length L of the light-emitting surface of the auxiliary lighting apparatus 23 set at 150 [mm]. FIG. 13 tells that, while the identification rate is maintained at relatively high values when the angle θ falls within a range of 0 to 60 degrees, there is a significant reduction in the identification rate when the angle θ exceeds 60 degrees.

Figure 4:
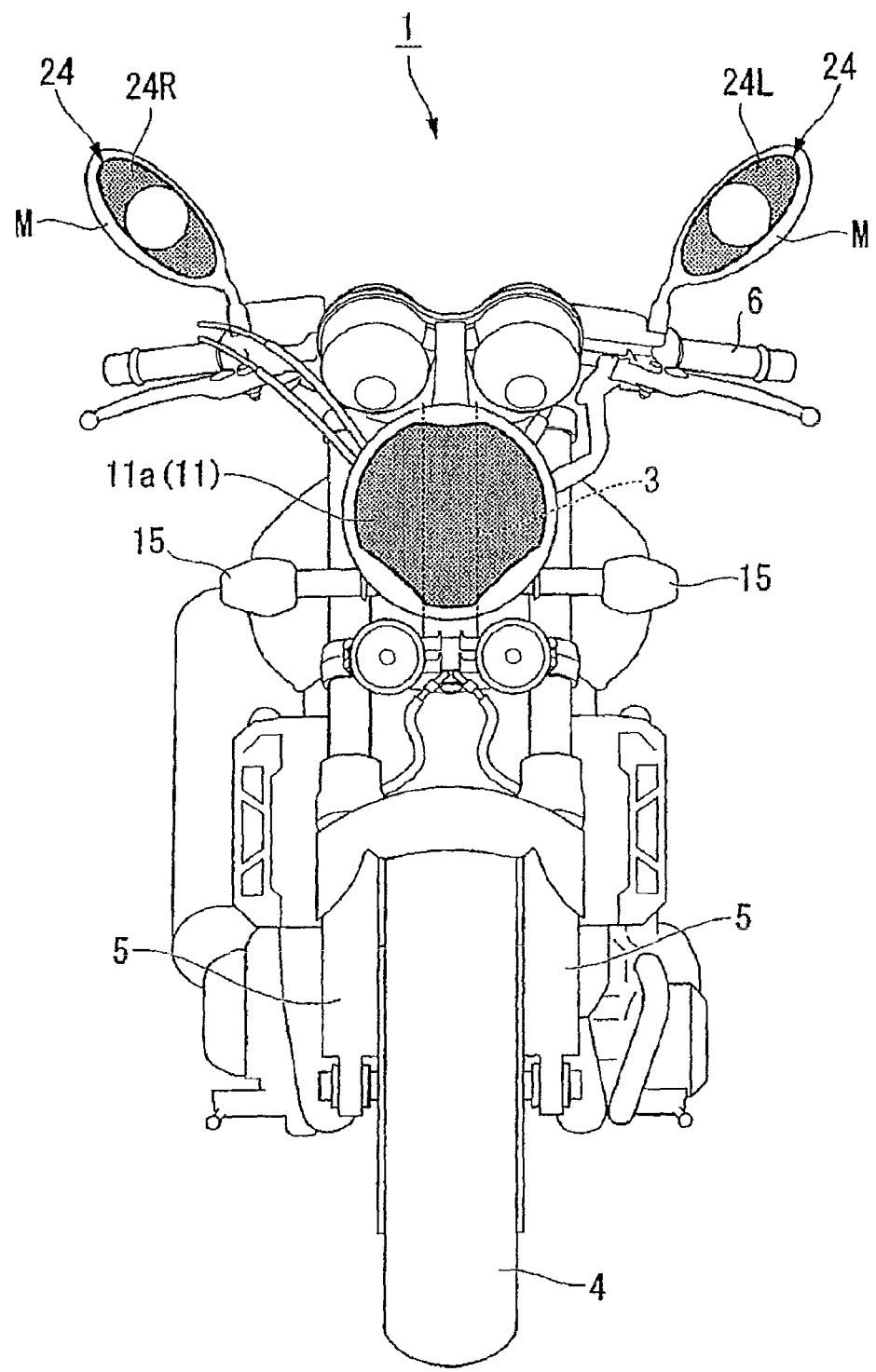
FIG. 4 is a front view showing a motorcycle according to a third modified example of the embodiment of the present invention.

Referring to FIG. 4, light-emitting surfaces of the annular shape and light-emitting surfaces of the oblique line segment shape may be appropriately combined to form the auxiliary lighting apparatuses 24 having light-emitting surfaces 24R, 24L of an up-angled eye shape (elliptic shape) in the vehicle front view.

Figure 5:
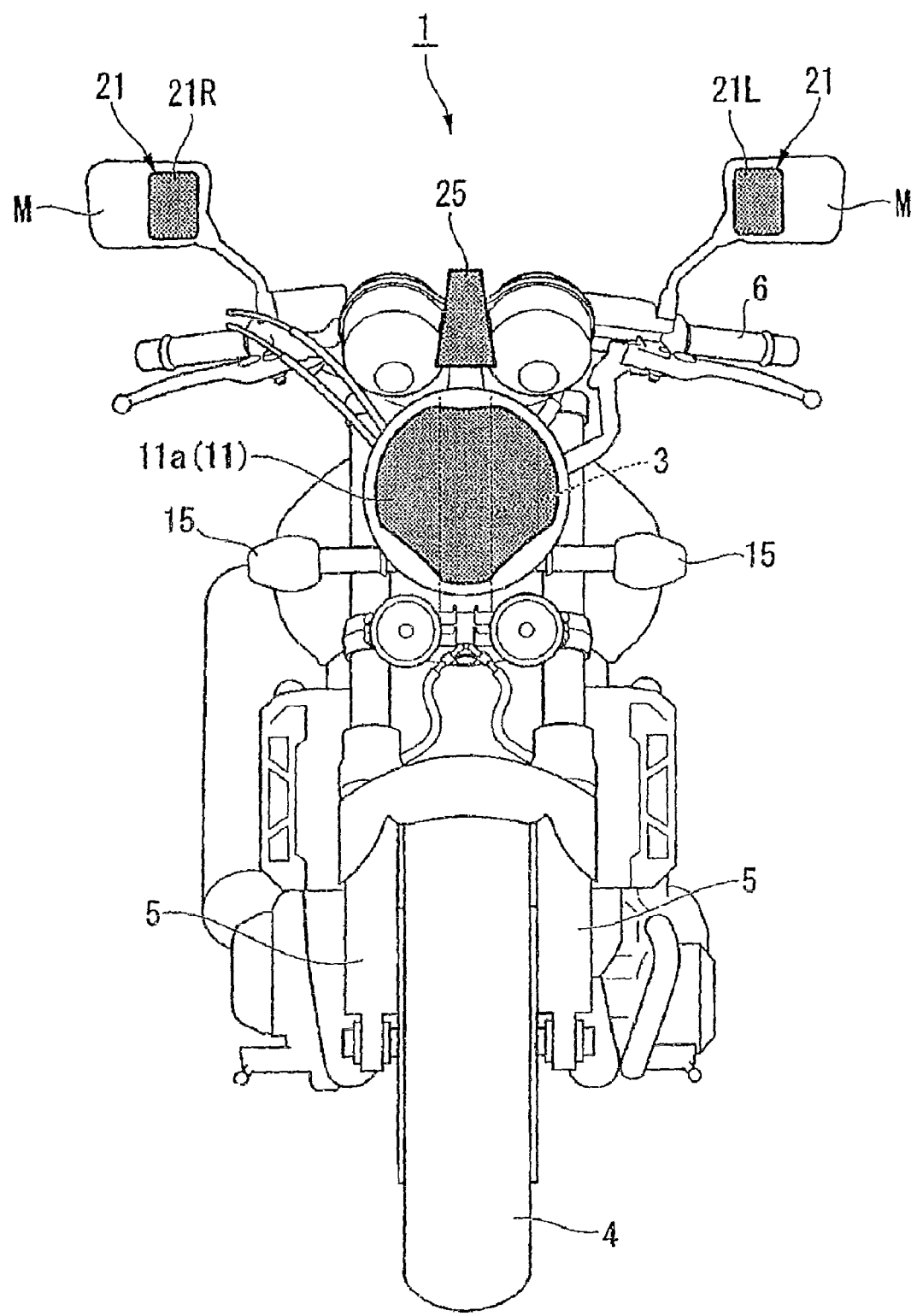
FIG. 5 is a front view showing a motorcycle according to a fourth modified example of the embodiment of the present invention.

Referring further to FIG. 5, another possible arrangement includes an auxiliary lighting apparatus 25 separately disposed at a portion equivalent to a "nose" in the "face." The auxiliary lighting apparatus 25 has a luminous intensity lower than that of the main lighting apparatus that is equivalent to the "mouth" of the "face" of which the motorcycle front face is reminiscent. including those lighting apparatuses is reminiscent.

Figure 10A:
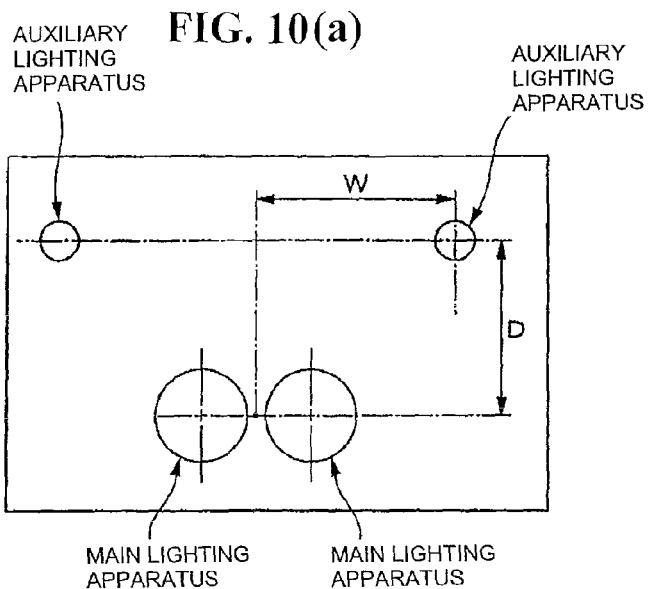
FIGS. 10(a) and 10(b) are explanatory diagrams for illustrating the operation of a fifth modified example of the embodiment of the present invention, corresponding to FIGS. 6(a) and 6(b), FIG. 10(a) showing predetermined dimensions in a front view of a motorcycle having two main lighting apparatuses and FIG. 10(b) showing a distribution of identification rates of the motorcycle according to the predetermined dimensions.
Figure 10B:
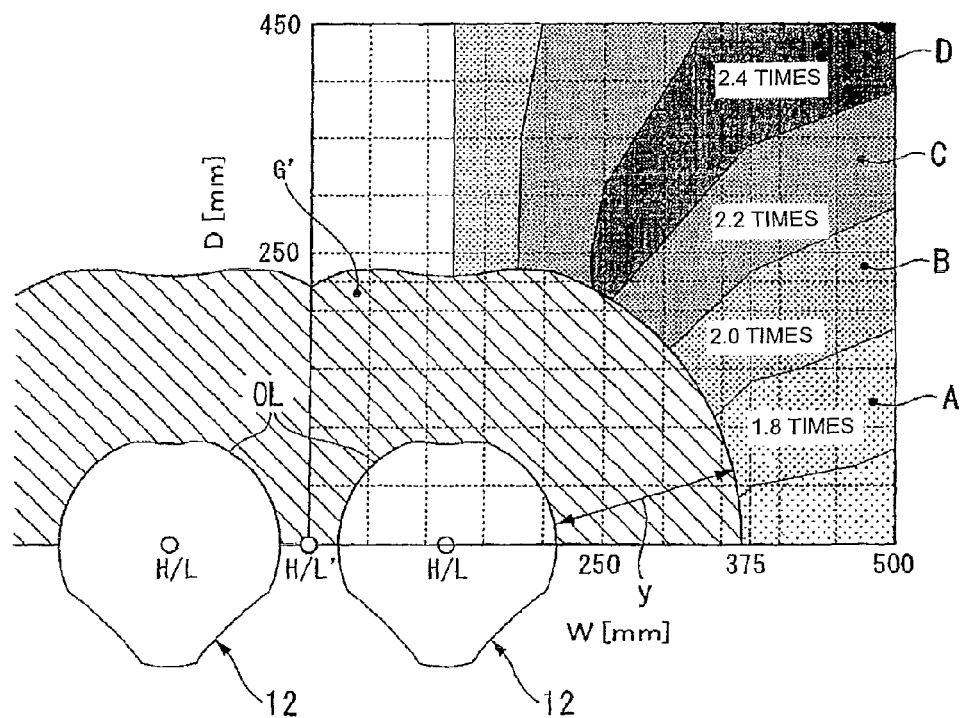

Referring to FIGS. 10(a) and 10(b), the motorcycle may include a dual-bulb main lighting apparatus 12 (having a plurality of light-emitting surfaces 12a). In this arrangement, a centroid H/L' of the entire main lighting apparatus 12 is each of centroids H/L of the light-emitting surfaces combined together (in FIG. 10(b), the center between the centroids H/L of the light-emitting surfaces). A glare area G' defined by a width y outside an outline OL of each light-emitting surface is greater than the glare area G of the main lighting apparatus 11 of the single-bulb type. The glare area G' overlaps part of each of the above-described areas to shave off the part, thereby making smaller the areas.

An experimental setup measuring the identification rate of the motorcycle 1 will be described below.

Figure 14:
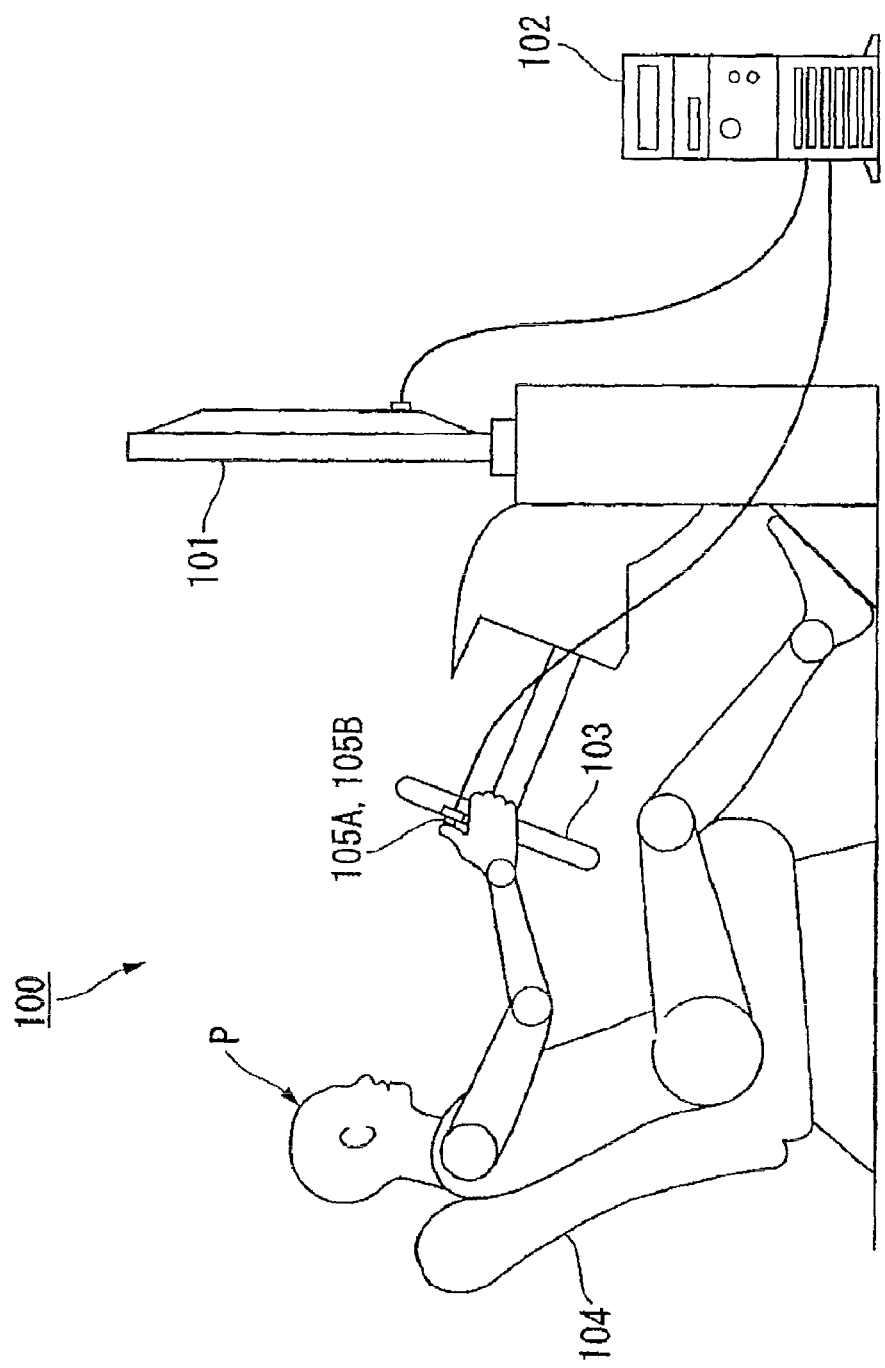
FIG. 14 is a schematic view showing an experimental setup for measuring the identification rate.

An experimental setup 100 shown in FIG. 14 includes a display 101, a personal computer 102, a steering wheel 103, a seat 104, and response buttons 105A, 105B. The steering wheel 103 and the seat 104 simulate those on passenger vehicles. An observer (subject) P is seated in the seat 104 with his/her hands holding onto the steering wheel 103 and observes the display 101 ahead of him/her. The display 101 shows a computer graphics image (perspective view) processed by the personal computer 102. The observer P is to respond whether the motorcycle 1 exists within the image. The response buttons 105A, 105B are disposed on the steering wheel 103. The observer P is to press the response button 105A if he/she confirms presence of the motorcycle 1 within the image and the response button 105B if he/she does not confirm presence of the motorcycle 1 within the image.

An operation of each of the response buttons 105A, 105B is inputted to the personal computer 102 and whether or not the observer P could identify the motorcycle 1 within the image shown on the display 101 is recorded. The personal computer 102 stores therein a plurality of perspective views of a typical traffic intersection scene generated through computer graphics. Each of these perspective views of a typical traffic intersection scene is unique, different from the others in terms of background images and placement of vehicles. For each of these perspective views of a typical traffic intersection scene, three different kinds of images are provided one including a single motorcycle 1 having a single-bulb main lighting apparatus, one including a single motorcycle 1 mounted with the above-described lighting system of the embodiment of the present invention, and the other including no motorcycle 1.

The display 101 randomly shows each of the three different kinds of perspective views at 0.5-sec. intervals. After the image is presented, the observer P responds using the response buttons 105A, 105B as to whether the presented image contained the motorcycle 1 or not. The ratio of the number of images in which the observer P confirmed the presence of the motorcycle 1 to the number of images presented containing the motorcycle 1 is then recorded as the identification rate of the motorcycle 1 in each of the images.

Each of above-cited graphs is based on the results obtained from the above experiment. The "ratio" shown in each graph represents the quotient of the identification rate of the motorcycle 1 mounted with the above-described lighting system divided by the identification rate of the motorcycle 1 having the single-bulb main lighting apparatus 11.

As described heretofore, the vehicle lighting system according to the embodiment of the present invention has the main lighting apparatus 11 including the main light-emitting surface 11a that illuminates the vehicle forward area and flashing type lighting apparatuses 15 disposed laterally sideways at right and left of the main lighting apparatus 11 in the vehicle front view. In this vehicle lighting system, the glare area G with the width y as expressed in expression 1 when the main lighting apparatus 11 has a luminous intensity of x is defined outside the outline OL of the main light-emitting surface 11a in the vehicle front view. Further, the auxiliary lighting apparatus disposition area H1 to H3, in which the auxiliary lighting apparatus 21 to 24 of the steadily lighting type different from the flashing type lighting apparatuses 15 is disposed, is set upwardly of the main lighting apparatus 11 and outside the glare area G.

In accordance with the foregoing arrangements, the vehicle front surface is made to be readily reminiscent of a "face," having the main lighting apparatus 11 as a "mouth" and the auxiliary lighting apparatuses 21 to 24 as "eyes," so that conspicuity of the vehicle can be easily enhanced.

The auxiliary lighting apparatuses 21 to 24, being disposed outside the glare area G of the main lighting apparatus 11, help inhibit the outline of the light-emitting surface of each lighting apparatus from blurring to be fused. The vehicle front surface can therefore be readily reminiscent of a "face," so that the conspicuity of the vehicle can be easily enhanced. The steadily lighting type auxiliary lighting apparatuses 21 to 24 are provided in addition to the flashing type lighting apparatuses 15. This results in the "mouth" and the "eyes" being steadily lit up, which helps make the vehicle front surface reminiscent of a "face."

In the vehicle lighting system according to an embodiment of the present invention, the auxiliary lighting apparatus disposition area H1 is set at the position that is, in the vehicle front view, upward of the upper end of the glare area G and laterally outside the left or right ends of the glare area G. Accordingly, the auxiliary lighting apparatuses 21 to 24 are disposed upwardly of the glare area G of the main lighting apparatus 11 and laterally outside the left and right ends of the glare area G apart from each other. In addition, the auxiliary lighting apparatuses 21 to 24 are disposed at appropriate positions equivalent to the "eyes" of the "face," of which the vehicle front face is reminiscent. This makes the vehicle front surface readily reminiscent of the "face," so that the conspicuity of the vehicle can be easily enhanced.

In the vehicle lighting system according to an embodiment of the present invention, the auxiliary lighting apparatus disposition area H2 is set, in the vehicle front view, within the area defined between the first inclined line L1 extending obliquely upwardly at an angle of 35 degrees relative to the vertical line from the centroid H/L of the main light-emitting surface 11a and the second inclined line L2 extending obliquely upwardly at an angle of 55 degrees relative to the vertical line from the centroid H/L, and outside the area defined by the width 2y outside the outline OL of the main light-emitting surface 11a. Similarly as above, the foregoing arrangements make the vehicle front surface readily reminiscent of the "face," so that the conspicuity of the vehicle can be easily enhanced.

In the vehicle lighting system according to an embodiment of the present invention, the auxiliary lighting apparatus disposition area H3 is the area surrounded by the above-referenced line segments when the centroid H/L of the main light-emitting surface 11a in the vehicle front view is defined as the origin and W [mm] is the abscissa and D [mm] is the ordinate. The auxiliary lighting apparatuses 21 to 24 are disposed even further apart from the glare area G of the main lighting apparatus 11. In addition, the auxiliary lighting apparatuses 21 to 24 are disposed at even more appropriate positions equivalent to the "eyes" of the "face," of which the vehicle front face is reminiscent. The conspicuity of the vehicle can therefore be even more easily enhanced.

In the vehicle lighting system according to an embodiment of the present invention, if the light source of the auxiliary lighting apparatus is disposed in the auxiliary lighting apparatus disposition area, the contrast with surrounding areas, because of the light source of the auxiliary lighting apparatus emitting an even more intense light, is more readily reminiscent of the black part of the "eye." This makes the vehicle front surface effectively readily reminiscent of the "face."

In the vehicle lighting system according to an embodiment of the present invention, the auxiliary lighting apparatus 22 emits light in the annular shape in the vehicle front view. If the center of the annular shape is disposed in the auxiliary lighting apparatus disposition area, the contrast, which is produced because the center of the annular shape emits light less intense than that emitted by the light-emitting surface of the annular shape, is more readily reminiscent of the black part of the "eye," which makes the vehicle front surface readily reminiscent of the "face" effectively.

In the vehicle lighting system according to an embodiment of the present invention, the auxiliary lighting apparatus 23 emits light in the line segment shape inclined so as to be disposed more upwardly at outer sides in the vehicle width direction in the vehicle front view. Preferably, the auxiliary lighting apparatus is disposed at an angle of 0 to 60 degrees relative to the vertical line and has at least a length of 150 [mm]. Based on the fact that human beings recognize more easily an oblique component as compared with vertical and horizontal components, the auxiliary lighting apparatus 23 is arranged to emit light in an oblique line segment shape and have an adequate length. These arrangements help make the "eye" more easily recognizable. This makes the vehicle front surface readily reminiscent of the "face," so that the conspicuity of the vehicle can be easily enhanced.

In the vehicle lighting system according to an embodiment of the present invention, the main lighting apparatus 11 and the flashing type lighting apparatus 15 emit light of different colors from each other and the auxiliary lighting apparatuses 21 to 24 emit light of a similar color as that of the light emitted by the main lighting apparatus 11. Accordingly, the main lighting apparatus 11 and the auxiliary lighting apparatuses 21 to 24 are made to emit light of a color different from that of the flasher or other flashing type lighting apparatus 15. This helps make the vehicle front surface readily reminiscent of the "face," having the main lighting apparatus 11 as a "mouth" and the auxiliary lighting apparatuses 21 to 24 as "eyes," regardless of whether the flashing type lighting apparatus 15 is turned ON, so that conspicuity of the vehicle can be easily enhanced.

In the vehicle lighting system according to the embodiment of the present invention, the auxiliary lighting apparatuses 21 to 24 are disposed symmetrically about the main lighting apparatus 11. The auxiliary lighting apparatuses 21 to 24 as the "eyes" are disposed symmetrically about the main lighting apparatus 11 as the "mouth." This makes the vehicle front surface even more readily reminiscent of the "face."

In the vehicle lighting system according to an embodiment of the present invention, the main lighting apparatus 11 includes the low beam lamp illuminating a relatively nearby area and the high beam lamp illuminating a remote area relative to the area illuminated by the low beam lamp. The auxiliary lighting apparatus disposition area H1 to H3 is set corresponding to the glare area when the low beam lamp is turned ON. This makes the vehicle front surface reminiscent of the "face" even when the low beam lamp, which is less noticeable when the high beam lamp is turned ON, is turned ON. Thus, the conspicuity of the vehicle can therefore be enhanced.

The present invention is not limited to the above-described embodiment and is applicable, for example, to a three-wheeled or a four-wheeled vehicle, in addition to the motorcycle 1.

The high beam lamp and the low beam lamp may be formed in respective individual lighting bodies and the main lighting apparatus may be the low beam lamp. This allows the high beam lamp to be disposed without regard to the positions of the auxiliary lighting apparatuses 21 to 24, which easily enhances the degree of freedom in disposing the high beam lamp.

While the present invention has been described with reference to the preferred embodiment, it will be understood by those skilled in the art that various changes in form and detail may be made therein without departing from the spirit and scope of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle lighting system having a main lighting apparatus including a main light-emitting surface that illuminates a vehicle forward area and flashing type lighting apparatuses disposed laterally sideways right and left of the main lighting apparatus in a vehicle front view, comprising:
    a glare area with a width y as expressed in an expression given below when the main lighting apparatus has a luminous intensity of x is defined outside an outline of the main light-emitting surface in the vehicle front view; and
    an auxiliary lighting apparatus disposition area, in which an auxiliary lighting apparatus of a steadily lighting type different from the flashing type lighting apparatuses is disposed, is set upwardly of the main lighting apparatus and outside the glare area:

$y = a + b \cdot \ln(x)$ (ln is a natural logarithm)

$a = -107$ $b = 39.6$.

2. The vehicle lighting system according to claim 1, wherein the auxiliary lighting apparatus disposition area is set at a position that is, in the vehicle front view, upward of an upper end of the glare area and laterally outside a left or right end of the glare area.

3. The vehicle lighting system according to claim 1, wherein the auxiliary lighting apparatus disposition area is set, in the vehicle front view, within an area defined between a first inclined line extending obliquely upwardly at an angle of 35 degrees relative to a vertical line from a centroid of the main light-emitting surface and a second inclined line extending obliquely upwardly at an angle of 55 degrees relative to the vertical line from the centroid, and outside an area defined by a width 2y outside the outline of the main light-emitting surface.

4. The vehicle lighting system according to claim 1, wherein the auxiliary lighting apparatus disposition area is an area surrounded by line segments specified by coordinates as detailed below when the centroid of the main light-emitting surface in the vehicle front view is defined as an origin and W [mm] is an abscissa and D [mm] is an ordinate,
    (1) A first line segment that passes through (W335, D450) and (W250, D310)
    (2) A second line segment that passes through (W250, D310) and (W238, D224)
    (3) A third line segment that passes through (W238, D224) and (W252, D210)
    (4) A fourth line segment that passes through (W252, D210) and (W267, D224)
    (5) A fifth line segment that passes through (W267, D224) and (W367, D342)
    (6) A sixth line segment that passes through (W367, D342) and (W500, D390)
    (7) A seventh line segment specified by D=450
    (8) An eighth line segment specified by W=500.

5. The vehicle lighting system according to claim 1, wherein the auxiliary lighting apparatus has a light source disposed in the auxiliary lighting apparatus disposition area.

6. The vehicle lighting system according to claim 2, wherein the auxiliary lighting apparatus has a light source disposed in the auxiliary lighting apparatus disposition area.

7. The vehicle lighting system according to claim 3, wherein the auxiliary lighting apparatus has a light source disposed in the auxiliary lighting apparatus disposition area.

8. The vehicle lighting system according to claim 4, wherein the auxiliary lighting apparatus has a light source disposed in the auxiliary lighting apparatus disposition area.

9. The vehicle lighting system according to claim 1, wherein the auxiliary lighting apparatus emits light in an annular shape in the vehicle front view and a center of the annular shape is disposed in the auxiliary lighting apparatus disposition area.

10. The vehicle lighting system according to claim 2, wherein the auxiliary lighting apparatus emits light in an annular shape in the vehicle front view and a center of the annular shape is disposed in the auxiliary lighting apparatus disposition area.

11. The vehicle lighting system according to claim 3, wherein the auxiliary lighting apparatus emits light in an annular shape in the vehicle front view and a center of the annular shape is disposed in the auxiliary lighting apparatus disposition area.

12. The vehicle lighting system according to claim 4, wherein the auxiliary lighting apparatus emits light in an annular shape in the vehicle front view and a center of the annular shape is disposed in the auxiliary lighting apparatus disposition area.

13. The vehicle lighting system according to claim 1, wherein the auxiliary lighting apparatus emits light in a line segment shape inclined so as to be disposed more upwardly at outer sides in a vehicle width direction in the vehicle front view, the auxiliary lighting apparatus being disposed at an angle of 0 to 60 degrees relative to a vertical line and having at least a length of 150 [mm].

14. The vehicle lighting system according to claim 2, wherein the auxiliary lighting apparatus emits light in a line segment shape inclined so as to be disposed more upwardly at outer sides in a vehicle width direction in the vehicle front view, the auxiliary lighting apparatus being disposed at an angle of 0 to 60 degrees relative to a vertical line and having at least a length of 150 [mm].

15. The vehicle lighting system according to claim 3, wherein the auxiliary lighting apparatus emits light in a line segment shape inclined so as to be disposed more upwardly at outer sides in a vehicle width direction in the vehicle front view, the auxiliary lighting apparatus being disposed at an angle of 0 to 60 degrees relative to a vertical line and having at least a length of 150 [mm].

16. The vehicle lighting system according to claim 4, wherein the auxiliary lighting apparatus emits light in a line segment shape inclined so as to be disposed more upwardly at outer sides in a vehicle width direction in the vehicle front view, the auxiliary lighting apparatus being disposed at an angle of 0 to 60 degrees relative to a vertical line and having at least a length of 150 [mm].

17. The vehicle lighting system according to claim 1, wherein the main lighting apparatus and the flashing type lighting apparatus emit light of different colors from each other and the auxiliary lighting apparatus emits light of a similar color as that of the light emitted by the main lighting apparatus.

18. The vehicle lighting system according to claim 1, wherein the auxiliary lighting apparatuses are disposed symmetrically about the main lighting apparatus.

19. The vehicle lighting system according to claim 1, wherein the vehicle includes a low beam lamp illuminating a relatively nearby area and a high beam lamp illuminating a remote area relative to the area illuminated by the low beam lamp and the main lighting apparatus is the low beam lamp.

20. The vehicle lighting system according to claim 1, wherein the main lighting apparatus includes a low beam lamp illuminating a relatively nearby area and a high beam lamp illuminating a remote area relative to the area illuminated by the low beam lamp and the auxiliary lighting apparatus disposition area is set corresponding to the glare area when the low beam lamp is turned ON.

* * * * *